(12) United States Patent
Esaki

(10) Patent No.: US 10,272,769 B2
(45) Date of Patent: Apr. 30, 2019

(54) MOUNTING STRUCTURE OF AIR INTAKE APPARATUS, MOUNTING METHOD OF AIR INTAKE APPARATUS AND FASTENING STRUCTURE OF RESIN MEMBER

(71) Applicant: AISIN SEIKI KABUSHIKI KAISHA, Kariya-shi, Aichi-ken (JP)

(72) Inventor: Yasuhiko Esaki, Chiryu (JP)

(73) Assignee: AISIN SEIKI KABUSHIKI KAISHA, Kariya-Shi, Aichi-Ken (JP)

(*) Notice: Subject to any disclaimer, the term of this patent is extended or adjusted under 35 U.S.C. 154(b) by 84 days.

(21) Appl. No.: 15/704,045

(22) Filed: Sep. 14, 2017

(65) Prior Publication Data
US 2018/0215251 A1    Aug. 2, 2018

(30) Foreign Application Priority Data
Jan. 30, 2017 (JP) .................................. 2017-013808

(51) Int. Cl.
| | | |
|---|---|---|
| *F02M 35/10* | (2006.01) | |
| *B60K 13/02* | (2006.01) | |
| *B60K 11/06* | (2006.01) | |

(52) U.S. Cl.
CPC ............. *B60K 13/02* (2013.01); *B60K 11/06* (2013.01)

(58) Field of Classification Search
CPC ................................ B60K 13/02; B60K 11/06
USPC ........................................ 123/184.21–184.61
See application file for complete search history.

(56) References Cited

U.S. PATENT DOCUMENTS

| | | | | |
|---|---|---|---|---|
| 3,285,311 A | * | 11/1966 | Vantine ..................... | F16B 5/01 411/277 |
| 5,799,930 A | * | 9/1998 | Willett .................... | B62D 24/02 267/141.4 |
| 2004/0200449 A1 | * | 10/2004 | Lang ................. | F02M 35/10052 123/184.21 |
| 2011/0168121 A1 | * | 7/2011 | Hisada ............. | F02M 35/10085 123/184.61 |

(Continued)

FOREIGN PATENT DOCUMENTS

| | | | |
|---|---|---|---|
| JP | 11101218 A | * | 4/1999 |
| JP | 2005-351322 A | | 12/2005 |

(Continued)

*Primary Examiner* — Marguerite J McMahon
(74) *Attorney, Agent, or Firm* — Buchanan Ingersoll & Rooney PC

(57) ABSTRACT

A mounting structure of an air intake apparatus includes an air intake apparatus including a first mounting portion made of resin and a second mounting portion made of resin, a first collar member made of metal positioned within a first mounting bore at the first mounting portion, a second collar member made of metal positioned within a second mounting bore at the second mounting portion, and a large diameter annular portion made of metal provided between the first and second collar members, the first collar member, the large diameter annular portion and the second collar member being fastened while making contact with one another in a state where the first mounting portion and the second mounting portion are fastened together relative to the cylinder head by a fastening member inserted to be positioned within the first collar member, the large diameter annular portion and the second collar member.

7 Claims, 10 Drawing Sheets

(56) References Cited

U.S. PATENT DOCUMENTS

2012/0031365 A1* 2/2012 Schweiger ....... F02M 35/10078
                                                123/184.21
2016/0305466 A1* 10/2016 Kawashima .......... F16B 43/001
2017/0268547 A1* 9/2017 Mori ...................... B62D 27/02
2018/0216586 A1* 8/2018 Netsu ........................ F02F 1/42

FOREIGN PATENT DOCUMENTS

| JP | 2006-170263 A |   | 6/2006 |
| --- | --- | --- | --- |
| JP | 2008-232039 A |   | 10/2008 |
| JP | 2014196789 A | * | 10/2014 |
| JP | 2016-098999 A |   | 5/2016 |

* cited by examiner

MOUNTING STRUCTURE OF AIR INTAKE APPARATUS, MOUNTING METHOD OF AIR INTAKE APPARATUS AND FASTENING STRUCTURE OF RESIN MEMBER

CROSS REFERENCE TO RELATED APPLICATIONS

This application is based on and claims priority under 35 U.S.C. § 119 to Japanese Patent Application 2017-013808, filed on Jan. 30, 2017, the entire content of which is incorporated herein by reference.

TECHNICAL FIELD

This disclosure generally relates to a mounting structure of an air intake apparatus, a mounting method of the air intake apparatus and a fastening structure of a resin member.

BACKGROUND DISCUSSION

A known mounting structure or a fastening structure of an intake manifold includes a metallic collar used for mounting the intake manifold made of resin to a cylinder head. Such mounting structure is disclosed, for example, in JP2008-232039A which is hereinafter referred to as Reference 1.

According to a mounting structure of an intake manifold (serving as an air intake apparatus and a resin member) disclosed in Reference 1, a housing into which a valve body of a tumble control valve is inserted to be positioned is disposed between the intake manifold made of resin and a cylinder head made of metal. The intake manifold includes a bolt bore (a second mounting bore) provided at a flange portion (a second mounting portion) of the intake manifold. The housing includes a bolt bore (a first mounting bore) into which a metallic collar (a first collar member) is inserted to be positioned for restraining deformation of the housing. The intake manifold is fixed together with the housing in a state where a bolt with a flange portion is inserted sequentially to the bolt bore of the intake manifold and to the bolt bore of the metallic collar (specifically, the bolt bore of the housing) and is fastened to a mounting surface of the cylinder head. At this time, a surface of the intake manifold facing the cylinder head and a surface of the collar facing the intake manifold are in contact with each other. In addition, the flange portion of the bolt is in contact with a surface of the intake manifold opposite from the surface thereof facing the cylinder head.

According to the mounting structure of the intake manifold disclosed in Reference 1, the intake manifold made of resin is in contact with the surface of the metallic collar facing the intake manifold in a state where the intake manifold is fastened to the cylinder head by the bolt. At this time, the intake manifold made of resin is fastened in a state being sandwiched between the flange portion of the bolt and the surface of the metallic collar facing the intake manifold, which leads to an excessive compression force applied to the intake manifold. Because of the excessive compression force applied from each of the bolt and the metallic collar to the intake manifold made of resin, creep may occur at the intake manifold so that strain deformation of the intake manifold gradually increases as time proceeds. As a result, looseness of the bolt may occur due to the creep generated at the intake manifold made of resin. The mounting structure of the air intake apparatus (the resin member) which restrains generation of looseness of the bolt caused by creep of the resin member of the air intake apparatus is desirable.

A need thus exists for a mounting structure of an air intake apparatus, a mounting method of the air intake apparatus and a fastening structure of a resin member which are not susceptible to the drawback mentioned above.

SUMMARY

According to an aspect of this disclosure, a mounting structure of an air intake apparatus includes an air intake apparatus made of resin and including a first mounting portion made of resin and a second mounting portion made of resin, the first mounting portion being mounted to a cylinder head of an engine, the second mounting portion being disposed between the first mounting portion and the cylinder head, a first collar member made of metal and inserted to be positioned within a first mounting bore provided at the first mounting portion, a second collar member made of metal and inserted to be positioned within a second mounting bore provided at the second mounting portion, and a large diameter annular portion made of metal and provided between the first collar member and the second collar member, the large diameter annular portion including an outer diameter greater than an outer diameter of a body portion of the first collar member and greater than an outer diameter of a body portion of the second collar member, the first collar member, the large diameter annular portion and the second collar member being fastened to one another while making contact with one another in a state where the first mounting portion and the second mounting portion are fastened together relative to the cylinder head of the engine by a fastening member which is inserted to be positioned within the first collar member, the large diameter annular portion and the second collar member.

According to another aspect of this disclosure, a mounting method of an air intake apparatus includes a first preparing process preparing a first mounting portion made of resin and including a first mounting bore into which a first collar member made of metal is inserted to be positioned, a second preparing process preparing a second mounting portion made of resin and including a second mounting bore into which a second collar member made of metal is inserted to be positioned, the second mounting bore including a shorter length in a center axis direction thereof than a length of the second collar member in a center axis direction thereof, an arranging process arranging a large diameter annular portion made of metal between the first collar member and the second collar member so that the large diameter annular portion protrudes from one of a first surface of the first mounting portion and a second surface of the second mounting portion to the other of the first surface and the second surface at a boundary portion between the first surface and the second surface, the large diameter annular portion including an outer diameter greater than an outer diameter of a body portion of the first collar member and greater than an outer diameter of a body portion of the second collar member, and a fastening process fastening the first collar member, the large diameter annular portion and the second collar member until the first collar member, the large diameter annular portion and the second collar member make contact with one another in a state where the first mounting portion and the second mounting portion are fastened together relative to a cylinder head of an engine by a fastening member which is inserted to be positioned within the first collar member, the large diameter annular portion and the second collar member.

According to a further aspect of this disclosure, a fastening structure of a resin member includes a first mounting portion made of resin and mounted to a metal member, a second mounting portion made of resin and disposed between the first mounting portion and the metal member, a first collar member made of metal and inserted to be positioned within a first mounting bore provided at the first mounting portion, a second collar member made of metal and inserted to be positioned within a second mounting bore provided at the second mounting portion, and a large diameter annular portion made of metal and provided between the first collar member and the second collar member, the large diameter annular portion including an outer diameter greater than an outer diameter of a body portion of the first collar member and greater than an outer diameter of a body portion of the second collar member, the first collar member, the large diameter annular portion and the second collar member being fastened to one another while making contact with one another in a state where the first mounting portion and the second mounting portion are fastened together relative to the metal member by a fastening member which is inserted to be positioned within the first collar member, the large diameter annular portion and the second collar member.

BRIEF DESCRIPTION OF THE DRAWINGS

The foregoing and additional features and characteristics of this disclosure will become more apparent from the following detailed description considered with the reference to the accompanying drawings, wherein.

DETAILED DESCRIPTION

An embodiment of a mounting structure of an air intake apparatus, a mounting method of the air intake apparatus and a fastening structure of a resin member is explained with reference to the attached drawings. In the embodiment, an upstream and a downstream are defined on a basis of a flow of air flowing through an inside of an intake manifold 12 and being taken into a combustion chamber 11. In addition, a vertical direction in a state where an engine 1 with plural cylinders is mounted at a vehicle is defied to be an up-down direction. A direction where the plural cylinders are arranged next to one another is defined to be a front-rear direction. A direction orthogonal to the front-rear direction on a horizontal plane is defined to be a left-right direction.

Figure 1:
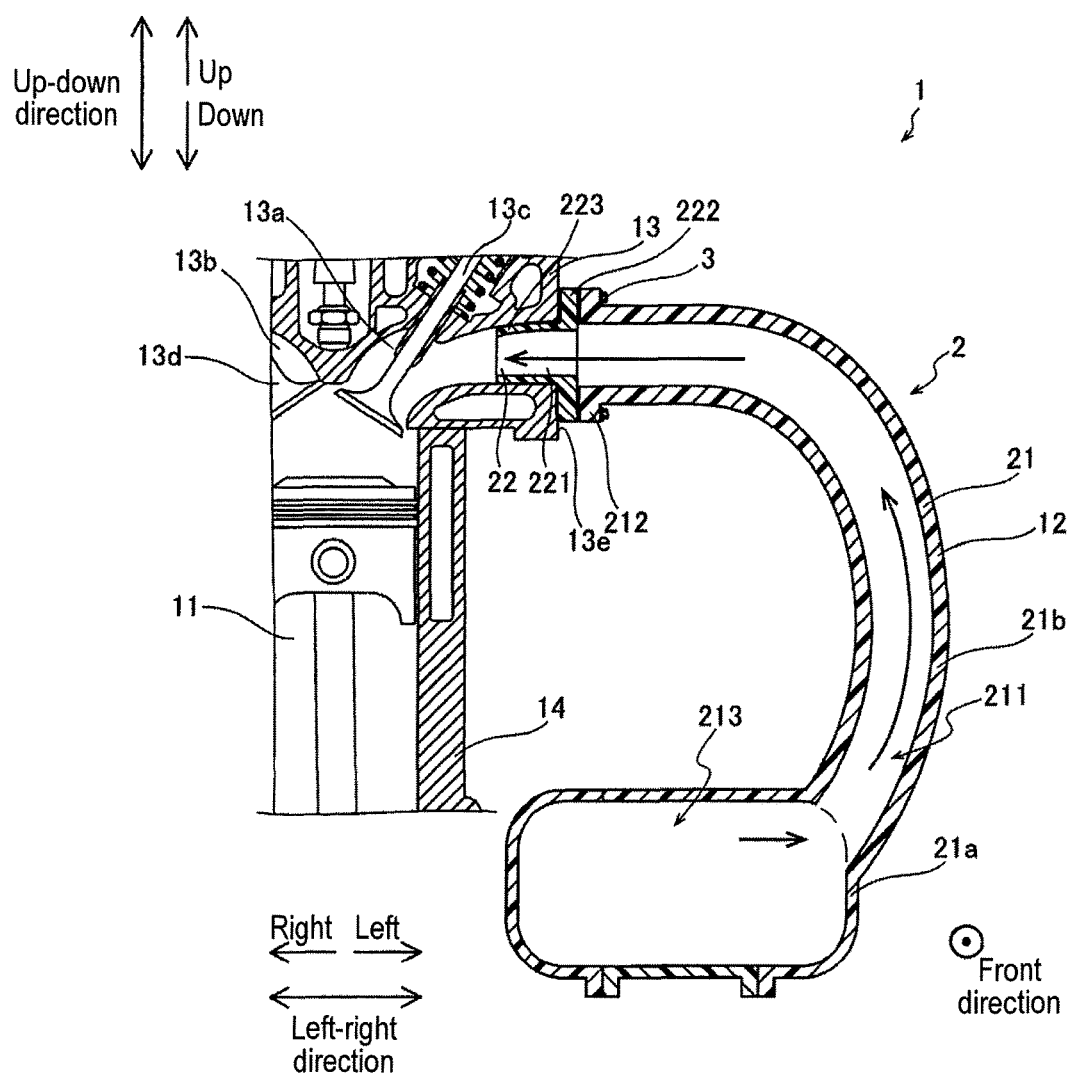
FIG. 1 is a cross-sectional view schematically illustrating a mounting structure of an air intake apparatus relative to a cylinder head according to an embodiment disclosed here.

As illustrated in FIG. 1, the engine 1 for an automobile is constructed so that a cylinder head 13 serving as an example of a metal member is connected to a cylinder block 14. The cylinder head 13 includes plural inlet ports 13a and plural outlet ports 13b connected to the combustion chamber 11. The cylinder head 13 also includes inlet valves 13c each of which opens and closes an opening via which the combustion chamber 11 and each of the plural inlet ports 13a are communicated with each other and outlet valves 13d each of which opens and closes an opening via which the combustion chamber 11 and each of the plural outlet ports 13b are communicated with each other. The engine 1 includes an air intake apparatus 2 made of resin and serving as an example of a rein member for supplying air to the combustion chamber 11 via the inlet ports 13a. The air intake apparatus 2 is constructed to be fixed to the cylinder head 13 by means of fasteners 3 each of which serves as an example of a fastening member.

Figure 2A:
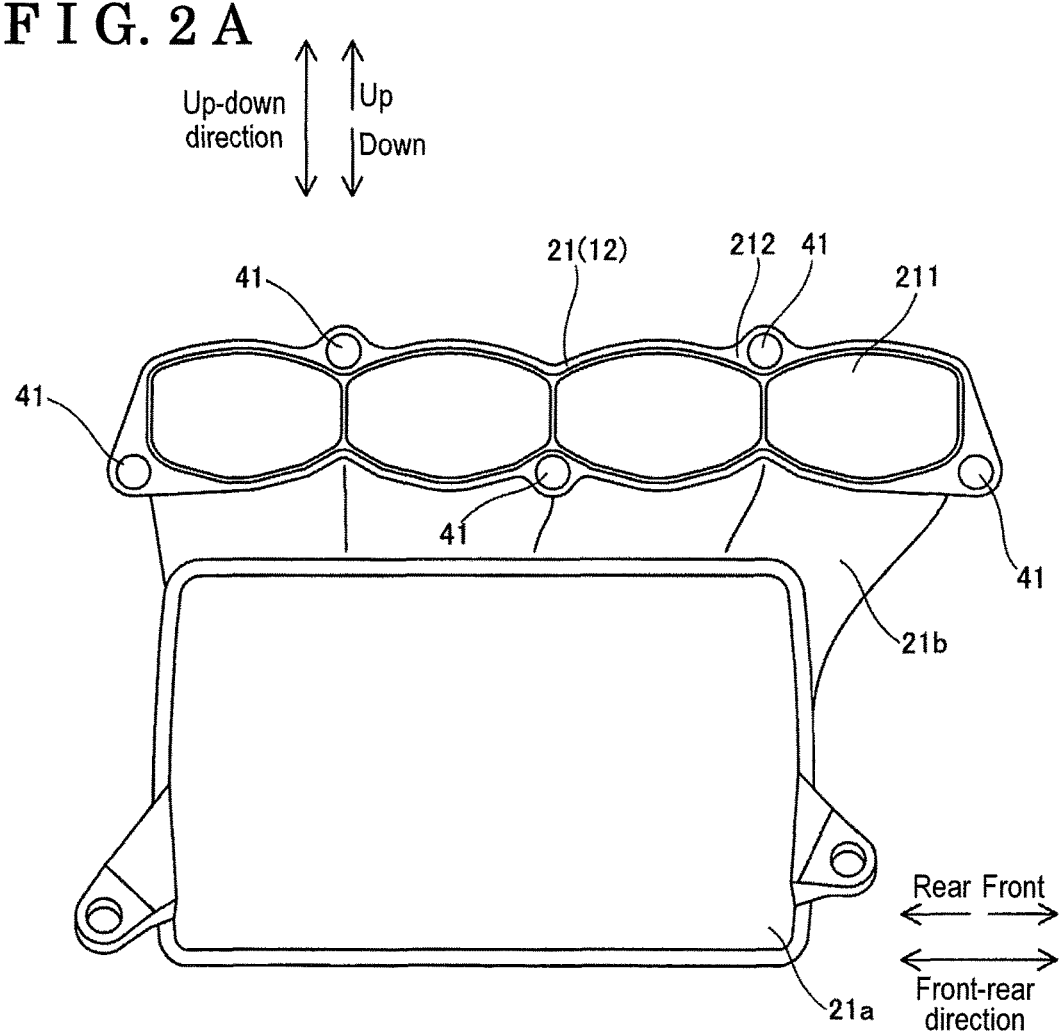
FIG. 2A is a perspective view schematically illustrating a first intake portion.

The air intake apparatus 2 includes a first intake portion 21 and a second intake portion 22 as illustrated in FIG. 1. The first intake portion 21 corresponds to the intake manifold 12 made of resin. The first intake portion 21 includes a surge tank 21a temporarily storing air and a first intake passage portion 21b connecting between the surge tank 21a and the second intake portion 22. As illustrated in FIG. 2A, the first intake passage portion 21b includes plural first intake passages 211 provided at an inner portion and a first flange portion 212 serving as an example of a first mounting portion provided for the plural first intake passages 211.

Figure 2B:
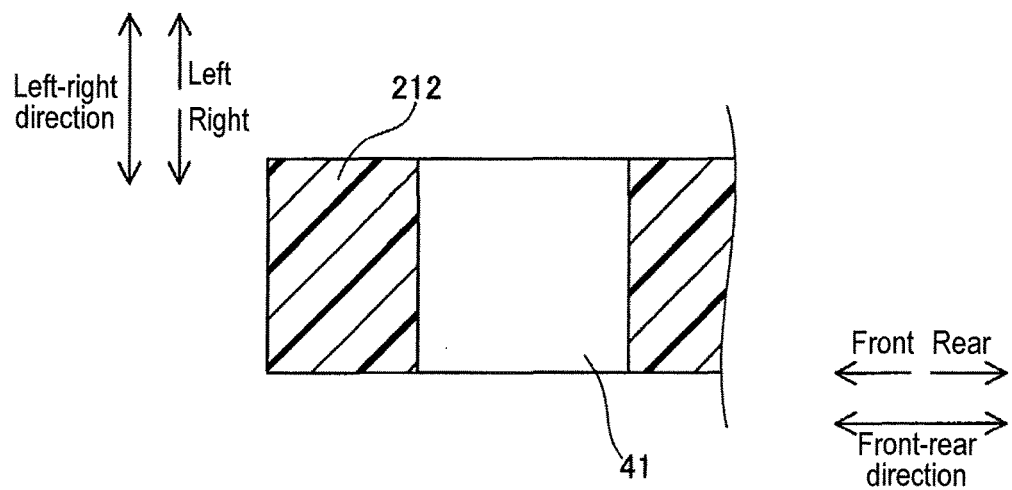
FIG. 2B is a cross-sectional view of a first insertion bore of a first flange portion.

The plural first intake passages 211 are arranged next to one another in the front-rear direction as illustrated in FIG. 2A. Each of the first intake passages 211 penetrates through the inner portion of the first intake passage portion 21b. Each of the first intake passages 211 is in communication with an inner void 213 of the surge tank 21a as illustrated in FIG. 1. The first flange portion 212 protrudes outward from an edge of a downstream end portion of the plural first intake passages 211. As illustrated in FIG. 2A, the first flange portion 212 is provided surrounding the plural first intake passages 211. Plural first insertion bores 41 each of which serves as an example of a first mounting bore are provided at the first flange portion 212 so that the fasteners 3 are inserted to be positioned within the respective first insertion bores 41. Each of the first insertion bores 41 includes a circular form as viewed from a right side. The plural first insertion bores 41 are provided at opposed end portions and a center portion of the first flange portion 212 in the front-rear direction, and a portion between the center portion and each of the opposed end portions of the first flange portion 212 in the front-rear direction. Each of the first insertion bores 41 penetrates through the first flange portion 212 in a thickness direction thereof as illustrated in FIG. 2B.

Figure 4:
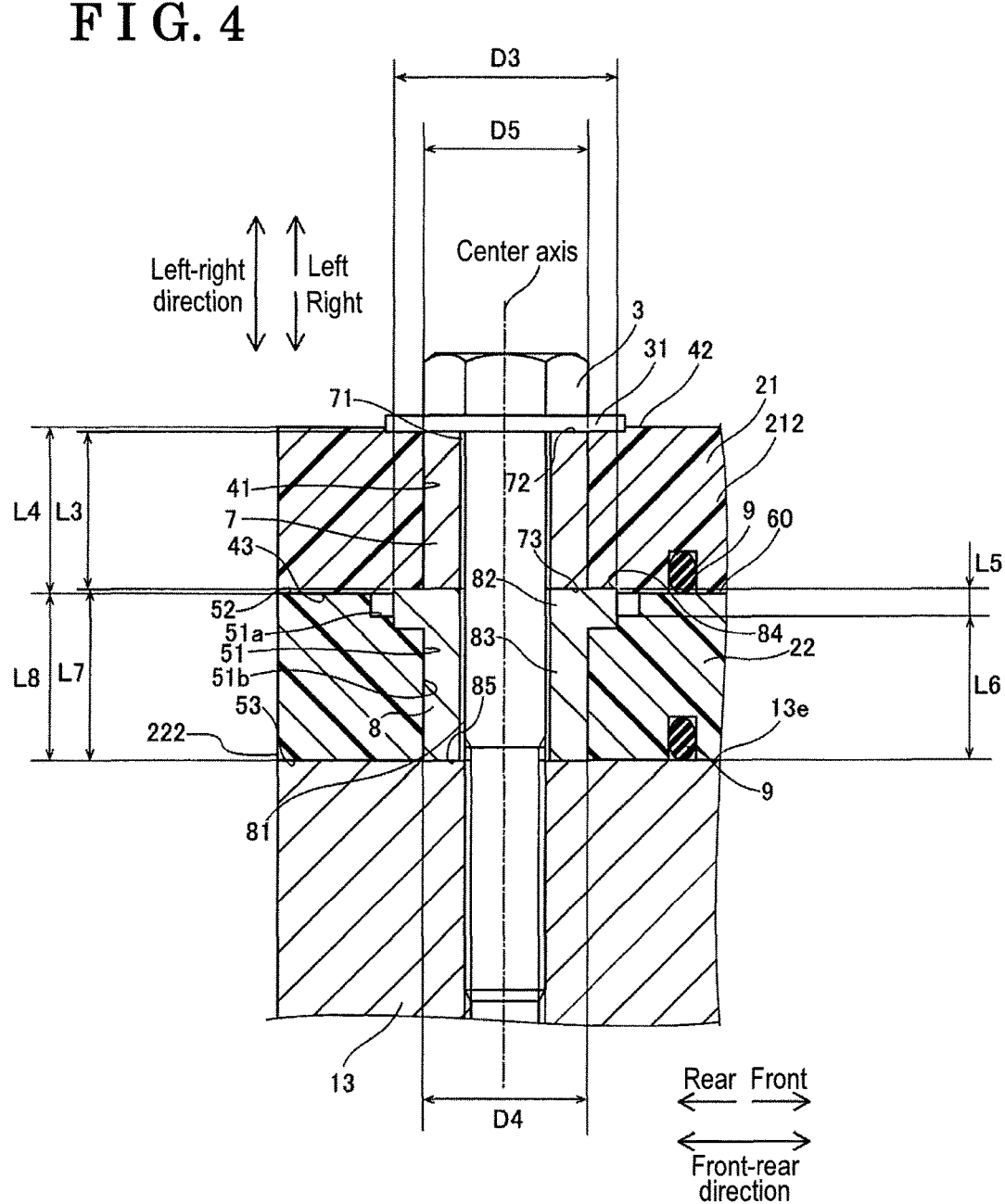
FIG. 4 is a cross-sectional view of the mounting structure of the air intake apparatus relative to the cylinder head according to the embodiment.

As illustrated in FIG. 4, a surface (a left surface) of the first flange portion 212 facing a flange portion 31 of the fastener 3 forms a first contact surface 42 which makes contact with the flange portion 31 of the fastener 3 in a state where the first flange portion 212 and a second flange portion 222 (which is explained later) are fastened by each of the fasteners 3. In addition, a surface (a right surface) of the first flange portion 212 facing the second flange portion 222 forms a second contact surface 43 serving as an example of a first surface which makes contact with the second flange portion 222 in a state where the first flange portion 212 and the second flange portion 222 are fastened by each of the fasteners 3.

The second intake portion 22 is an intake port made of resin and including protruding portions 223 protruding into the respective inlet ports 13*a* as illustrated in FIG. 1. The second intake portion 22 functions as a heat insulator which restrains heat transmission from the cylinder head 13 to each of the inlet ports 13*a*. Accordingly, a temperature of intake air flowing and passing through the inlet port 13*a* is restrained from increasing.

Figure 3A:
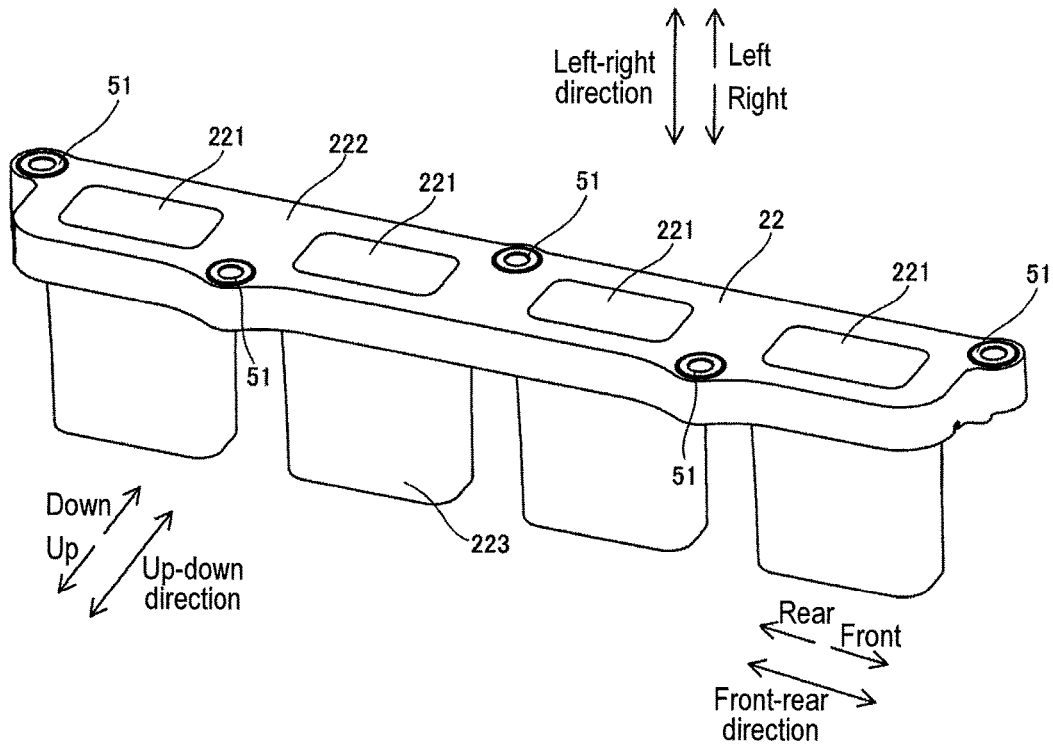
FIG. 3A is a perspective view schematically illustrating a second intake portion.

As illustrated in FIG. 3A, the second intake portion 22 includes plural second intake passages 221 provided at an inner portion of the second intake portion 22. The plural second intake passages 221 connect between the plural first intake passages 211 and the plural inlet ports 13*a* respectively. The plural second intake passages 221 are arranged next to one another in the left-right direction so as to correspond to the respective first intake passages 211. Each of the second intake passages 221 penetrates through the second intake portion 22 in a flow direction of air as illustrated in FIG. 1. The second intake portion 22 includes the second flange portion 222 serving as an example of a second mounting portion provided at an upstream end portion of the plural second intake passages 221 and the protruding portions 223 protruding to the downstream side from the second flange portion 222.

Figure 3B:
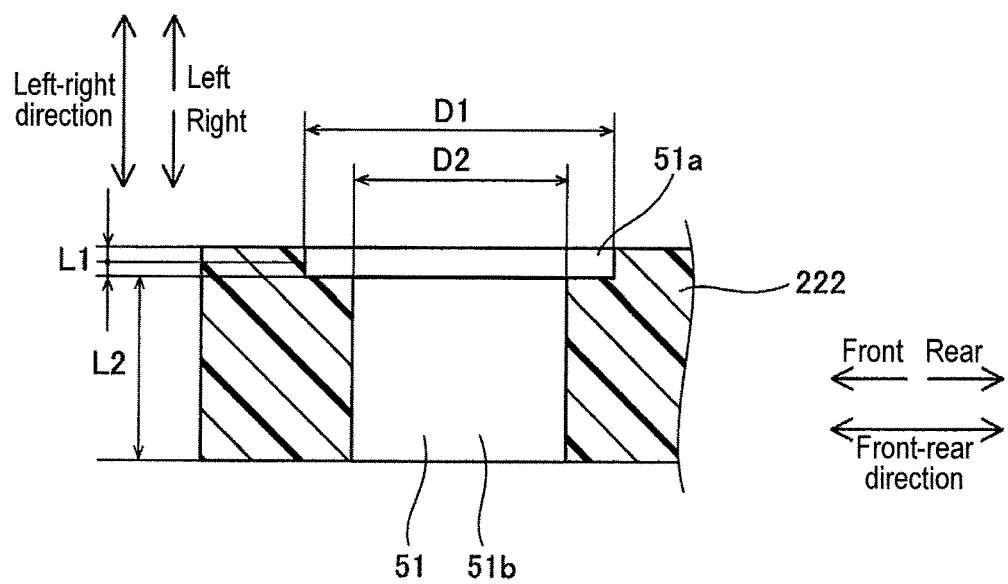
FIG. 3B is a cross-sectional view of a second insertion bore of a second flange portion.

The second flange portion 222 protrudes outward from an edge of the upstream end portion of the plural second intake passages 221. The second flange portion 222 is provided surrounding the plural second intake passages 221 as illustrated in FIG. 3A. Plural second insertion bores 51 each of which serves as an example of a second mounting bore are provided at the second flange portion 222 so that the fasteners 3 are inserted to be positioned within the respective second insertion bores 51. Each of the second insertion bores 51 includes a circular form as viewed from a left side. The plural second insertion bores 51 are provided at opposed end portions and a center portion of the second flange portion 222 in the front-rear direction, and a portion between the center portion and each of the opposed end portions of the second flange portion 222 in the front-rear direction. Each of the second insertion bores 51 penetrates through the second flange portion 222 in a thickness direction thereof as illustrated in FIG. 3B. Each of the second insertion bores 51 includes a first large diameter portion 51*a* and a first small diameter portion 51*b* including a smaller outer diameter than an outer diameter of the first large diameter portion 51*a*. The first large diameter portion 51*a* is provided at a left end portion at the second insertion bore 51. The first small diameter portion 51*b* is provided at a right side of the first large diameter portion 51*a* at the second insertion bore 51. At this time, the first large diameter portion 51*a* includes a length (depth) L1 in the left-right direction. In addition, the first small diameter portion 51*b* includes a length (depth) L2 in the left-right direction. Further, the first large diameter portion 51*a* includes an outer diameter D1 while the first small diameter portion 51*b* includes an outer diameter D2.

As illustrated in FIG. 4, a surface (a left surface) of the second flange portion 222 facing the first flange portion 212 forms a third contact surface 52 serving as an example of a second surface which makes contact with the first flange portion 212 in a state where the first flange portion 212 and the second flange portion 222 are fastened by each of the fasteners 3. In addition, a surface of the second flange portion 222 facing the cylinder head 13 forms a fourth contact surface 53 which serves as an end surface and which makes contact with the cylinder head 13 in a state where the first flange portion 212 and the second flange portion 222 are fastened by each of the fasteners 3. At this time, a plane at which the second contact surface 43 of the first flange portion 212 and the third contact surface 52 of the second flange portion 222 make surface contact with each other is a boundary surface 60 serving as an example of a boundary portion between the first flange portion 212 and the second flange portion 222.

As illustrated in FIG. 4, the air intake apparatus 2 is fixed to the cylinder head 13 by means of the fasteners 3. That is, each of the fasteners 3 is meshed with the cylinder head 13 while being inserted to be positioned within the first insertion bore 41 of the first flange portion 212 made of resin and the second insertion bore 51 of the second flange portion 222 made of resin. A fastening force of each of the fasteners 3 is applied to the first flange portion 212 and the second flange portion 222. At this time, a first collar member 7 made of metal is inserted to be positioned within the first insertion bore 41 of the first flange portion 212 and a second collar member 8 made of metal is inserted to be positioned within the second insertion bore 51 of the second flange portion 222 so that the fastening force of the fastener 3 is inhibited from becoming excessive relative to the first flange portion 212 and the second flange portion 222. In the following, the first collar member 7 and the second collar member 8 are explained in detail.

As illustrated in FIG. 4, the first collar member 7 includes a substantially cylindrical form and includes a first insertion bore 71 into which the fastener 3 is inserted to be positioned. An outer diameter D5 of the first collar member 7 is specified so as to conform to the configuration of the first insertion bore 41. The first collar member 7 is fitted to the first insertion bore 41 of the first flange portion 212. A length L3 of the first collar member 7 in the left-right direction (i.e., a length of the first collar member 7 in a center axis direction thereof) is specified to be smaller than a length L4 of the first insertion bore 41 in the left-right direction (i.e., a length of the first insertion bore 41 in a center axis direction thereof). A difference between the length L3 and the length L4 before the first flange portion 212 and the second flange portion 222 are fastened by each of the fasteners 3 is approximately 1% of the length L4.

A left surface of the first collar member 7 forms a first contact surface 72 which makes contact with the flange portion 31 of the fastener 3 as illustrated in FIG. 4. The first contact surface 72 is positioned at a right side relative to the first contact surface 42. A right surface of the first collar member 7 forms a second contact surface 73 which makes contact with a left surface of the second collar member 8. The second contact surface 73 is positioned at a left side relative to the second contact surface 43. That is, the first contact surface 42 and the second contact surface 43 of the first flange portion 212 are pressed and crushed after the first flange portion 212 and the second flange portion 222 are fastened by each of the fasteners 3.

As illustrated in FIG. 4, the second collar member 8 includes a substantially cylindrical form and includes a second insertion bore 81 into which the fastener 3 is inserted to be positioned. Outer diameters D3 and D4 of the second collar member 8 are specified so as to conform to the configuration of the second insertion bore 51. The second collar member 8 includes a second large diameter portion 82 and a second small diameter portion 83 which includes the outer diameter D4 smaller than the outer diameter D3 of the second large diameter portion 82. The second large diameter portion 82 serves as an example of a large diameter annular portion and an example of a flange portion. The second small diameter portion 83 serves as an example of a body portion. The second large diameter portion 82 is integrally provided with the second small diameter portion 83 of the second collar member 8. The second large diameter portion 82 is arranged between the second small diameter portion 83 and the first collar member 7. The outer diameter D3 of the second large diameter portion 82 is greater than the outer diameter D5 of the first collar member 7 and the outer diameter D4 of the second small diameter portion 83 of the second collar member 8.

The outer diameter D3 of the second large diameter portion 82 is smaller than the outer diameter D1 of the first large diameter portion 51a (see FIG. 3B). The outer diameter D4 of the second small diameter portion 83 is substantially the same as the outer diameter D2 of the first small diameter portion 51b (see FIG. 3B). Thus, the second collar member 8 is fitted into the second insertion bore 51 of the second flange portion 222. Before the first flange portion 212 and the second flange portion 222 are fastened by each of the fasteners 3, a length L5 of the second large diameter portion 82 of the second collar member 8 in the left-right direction is greater than the length L1 of the first large diameter portion 51a of the second insertion bore 51 in the left-right direction (see FIG. 3B). A difference between the length L5 and the length L1 is approximately 1% of the length L1. After the first flange portion 212 and the second flange portion 222 are fastened by each of the fasteners 3, a length L6 of the second small diameter portion 83 in the left-right direction is substantially the same as the length L2 of the first small diameter portion 51b of the second insertion bore 51 in the left-right direction (see FIG. 3B).

As illustrated in FIG. 4, a length L7 of the second collar member 8 in the left-right direction (i.e., a length of the second collar member 8 in a center axis direction thereof) is specified to be greater than a length L8 of the second insertion bore 51 in the left-right direction (i.e., a length of the second insertion bore 51 in a center axis direction thereof). A difference between the L7 and the L8 is approximately 1% of the length L8. Before the first flange portion 212 and the second flange portion 222 are fastened by each of the fasteners 3, a left end portion of the second collar member 8 protrudes leftward relative to a left end portion of the second insertion bore 51. That is, the left end portion of the second large diameter portion 82 protrudes leftward from the second contact surface 43.

The left surface of the second collar member 8 forms a third contact surface 84 which makes contact with the second contact surface 73 of the first collar member 7 as illustrated in FIG. 4. The third contact surface 84 is positioned at a left side relative to the third contact surface 52. A right surface of the second collar member 8 forms a fourth contact surface 85 which makes contact with the cylinder head 13. After the first flange portion 212 and the second flange portion 222 are fastened by each of the fasteners 3, the third contact surface 52 and the fourth contact surface 53 of the second flange portion 222 are pressed and crushed.

A seal member 9 is arranged at the second contact surface 43. The seal member 9 is pressed and crushed by the first collar member 7 and the second collar member 8. Accordingly, sealing ability between the first flange portion 212 and the second flange portion 222 is secured by the seal member 9. In addition, the seal member 9 is arranged at the fourth contact surface 53. The seal member 9 is pressed and crushed by the second collar member 8 and the cylinder head 13. Accordingly, sealing ability between the second flange portion 222 and the cylinder head 13 is secured by the seal member 9.

The air intake apparatus 2 including the aforementioned construction is mounted to the cylinder head 13 as follows.

Figure 5A:
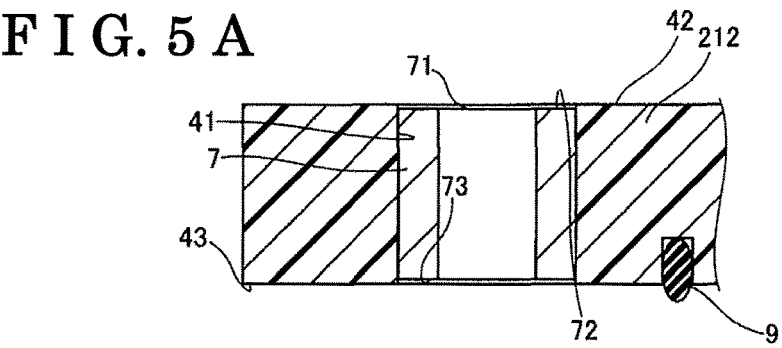
FIG. 5A is a cross-sectional view illustrating a first collar member fitted to the first insertion bore of the first flange portion.
Figure 5B:
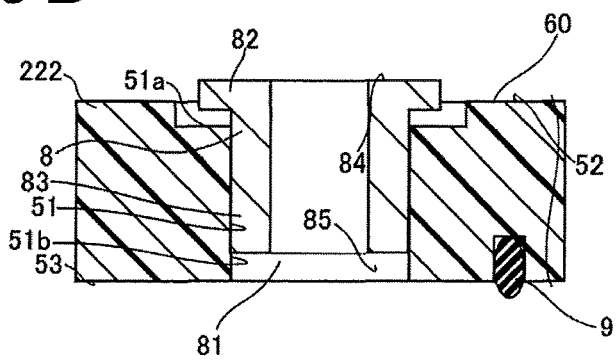
FIG. 5B is a cross-sectional view illustrating a second collar member fitted to the second insertion bore of the second flange portion.

As illustrated in FIG. 5A, a process for preparing the first flange portion 212 made of resin where the first collar member 7 made of metal is inserted to be positioned within the first insertion bore 41 is performed. That is, the process corresponds to fitting the first collar member 7 into the first insertion bore 41 of the first flange portion 212 of the first intake portion 21. The aforementioned process serves as a first preparing process. Next, as illustrated in FIG. 5B, a process for preparing the second flange portion 222 made of resin where the second collar member 8 is inserted to be positioned within the second insertion bore 51 is performed. That is, the process corresponds to fitting the second collar member 8 into the second insertion bore 51 of the second flange portion 222 of the second intake portion 22. The aforementioned process serves as a second preparing process.

Figure 5C:
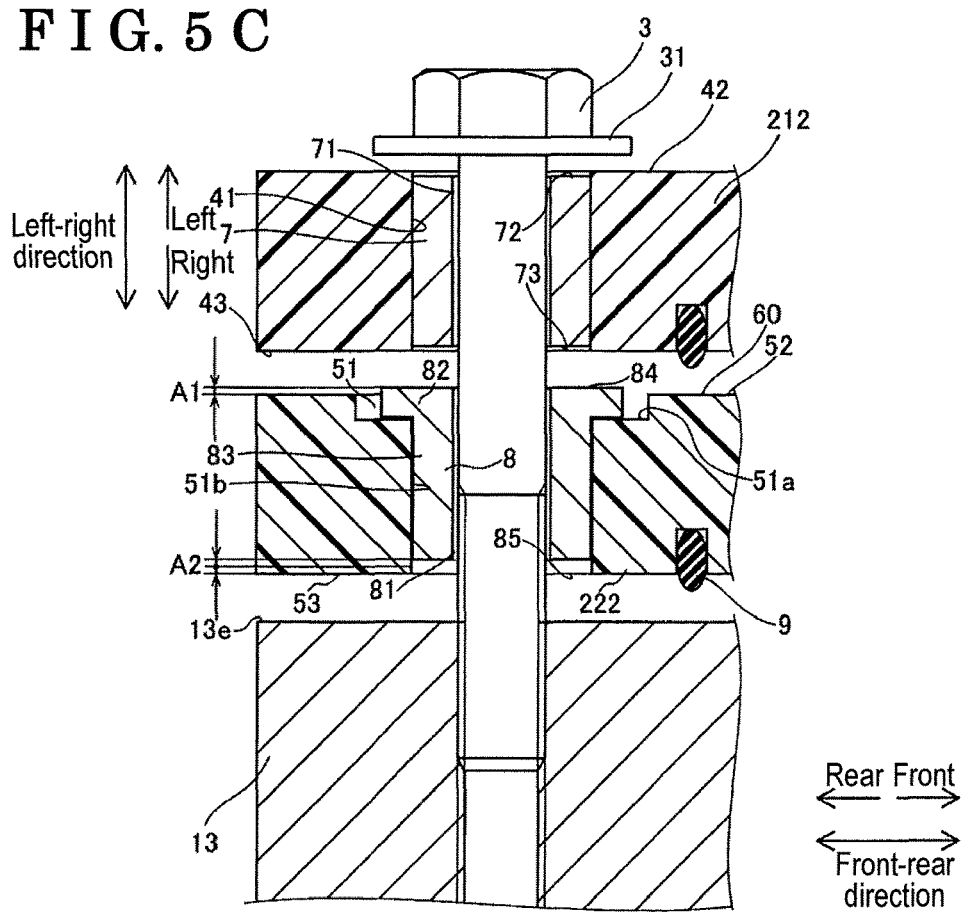
FIG. 5C is a cross-sectional view illustrating a fastening structure of the first flange portion to which the first collar member is fitted and the second flange portion to which the second collar member is fitted relative to the cylinder head.

Next, as illustrated in FIG. 5C, a process for arranging the second large diameter portion 82 of the second collar member 8 between the first collar member 7 and the second small diameter portion 83 of the second collar member 8 is performed. That is, the process corresponds to arranging at a right side of the cylinder head 13 the second flange portion 222 to which the second collar member 8 is fitted and the first flange portion 212 to which the first collar member 7 is fitted in the mentioned order. The aforementioned process serves as an arranging process. At this time, the second large diameter portion 82 is arranged protruding towards the second contact surface 43 from the third contact surface 52 at the boundary surface 60 between the second contact surface 43 of the first flange portion 212 and the third contact surface 52 of the second flange portion 222. In this case, a clearance A1 between the second contact surface 43 of the second flange portion 222 and the left surface of the second collar member 8 is smaller than a clearance A2 between the fourth contact surface 53 of the second flange portion 222 and the right surface of the second collar member 8.

Next, as illustrated in FIG. 4, a process for establishing a state where each of the fasteners 3 is inserted to be positioned within the first collar member 7, the second large diameter portion 82 and the second small diameter portion 83 of the second collar member 8 and for fastening the first flange portion 212 and the second flange portion 222 together relative to the cylinder head 13 by means of the fastener 3 is performed. The aforementioned process serves as a fastening process. At this time, the first flange portion 212 and the second flange portion 222 are together fastened to the cylinder head 13 by means of the fasteners 3 until the first collar member 7, the second large diameter portion 82, the second small diameter portion 83 of the second collar member 8 and the cylinder head 13 are brought to a state making contact with one another. That is, in the aforementioned contacting state, the first contact surface 72 of the first collar member 7 makes contact with the flange portion 31 of the fastener 3 and the second contact surface 73 of the first collar member 7 makes contact with the third contact surface 84 of the second collar member 8. In addition, in the aforementioned contacting state, the fourth contact surface 85 of the second collar member 8 makes contact with a front surface 13e (serving as an example of a mounting surface) of the cylinder head 13.

In a case where the first flange portion 212 and the second flange portion 222 are fastened together relative to the cylinder head 13 by means of the fasteners 3, the first contact surface 42 of the first flange portion 212 is pressed and crushed by the flange portion 31 of each of the fasteners 3. In addition, the second contact surface 43 of the first flange portion 212 is pressed and crushed by the third contact surface 84 of the second collar member 8. Further, a surface of the second flange portion 222 positioned at a left side of the first large diameter portion 51a of the second insertion bore 51 (i.e., a left surface of the second flange portion 222 is pressed and crushed by the second large diameter portion 82 of the second collar member 8. That is, the first flange portion 212 is compressed by the flange portion 31 of the fastener 3 and by the second large diameter portion 82 of the second collar member 8 based on the fastening force of the fasteners 3. The second flange portion 222 is also pressed and crushed by the second large diameter portion 82 of the second collar member 8 and by the cylinder head 13 based on the fastening force of the fasteners 3. The first flange portion 212 and the second flange portion 222 therefore make close contact with each other.

The following effects are obtainable by the embodiment.

In the aforementioned embodiment, the first collar member 7 made of metal and the second collar member 8 made of metal are in contact with each other in a state where the first flange portion 212 made of resin and the second flange portion 222 made of resin are fastened together relative to the cylinder head 13. Accordingly, the first flange portion 212 made of resin and the second flange portion 222 made of resin are restrained from being applied with an excess load from each of the fasteners 3 and the cylinder head 13 because a load caused by fastening of the fastener 3 is applied to each of the first collar member 7 and the second collar member 8. Each of the first flange portion 212 made of resin and the second flange portion 222 made of resin is thus restrained from suffering from creep which may increase strain deformation as time proceeds because of an excess stress generated at each of the first flange portion 212 and the second flange portion 222. As a result, looseness of the fastener 3 resulting from creep at each of the first flange portion 212 made of resin and the second flange portion 222 made of resin is restrained.

In addition, because the second large diameter portion 82 is provided at the second collar member 8, the first collar member 7 is restrained from getting into the second collar member 8. The second collar member 8 is also restrained from getting into the first insertion bore 41. As a result, in a state where the first flange portion 212 and the second flange portion 222 are fastened together, a clearance is restrained from being formed between any of the fastener 3, the first collar member 7 and the second collar member 8. Because the first collar member 7 and the second collar member 8 are in contact with each other, the fastening force (axial force) of the fastener 3 may be easily secured constant as compared to a case where the first collar member 7 and the second collar member 8 are inhibited from making contact with each other.

In the embodiment, before the first flange portion 212 and the second flange portion 222 are fastened by the fasteners 3, the second large diameter portion 82 of the second collar member 8 protrudes leftward relative to the third contact surface 52 of the second flange portion 222. Thus, after the first flange portion 212 and the second flange portion 222 are fastened by the fasteners 3, the second large diameter portion 82 of the second collar member 8 presses and crushes the second contact surface 43 of the first flange portion 212 and the surface of the second flange portion 222 positioned at a left side of the first large diameter portion 51a of the second insertion bore 51 (i.e., the left surface of the second flange portion 222. Accordingly, the flange portion 31 of the fastener 3 and the second large diameter portion 82 may securely sandwich the first flange portion 212. In addition, the second large diameter portion 82 and the cylinder head 13 may securely sandwich the second flange portion 222. A clearance may be difficult to be formed between the first flange portion 212 and any of the flange portion 31 of the fastener 3 and the second large diameter portion 82. A clearance may be also difficult to be formed between the second flange portion 222 and any of the second large diameter portion 82 and the cylinder head 13.

In the present embodiment, the second small diameter portion 83 and the second large diameter portion 82 are integrally provided at the second collar member 8. Thus, the number of components at the second collar member 8 may decrease and a fastening operation may be easily performed as compared to a case where the second small diameter portion 83 and the second large diameter portion 82 are separately provided with each other.

Further, in the present embodiment, the fasteners 3 are fastened until the first collar member 7, the second large diameter portion 82, the second small diameter portion 83 of the second collar member 8 and the cylinder head 13 make contact with one another. Thus, even when an excess fastening force is applied to the fastener 3 so as to excessively compress the first flange portion 212 and the second flange portion 222, the first flange portion 212 and the second flange portion 222 are restrained from being excessively compressed because of the first collar member 7 and the second collar member 8. As a result, the first flange portion 212 made of resin and the second flange portion 222 made of resin are restrained from being excessively compressed and are restrained from being damaged.

Figure 6:
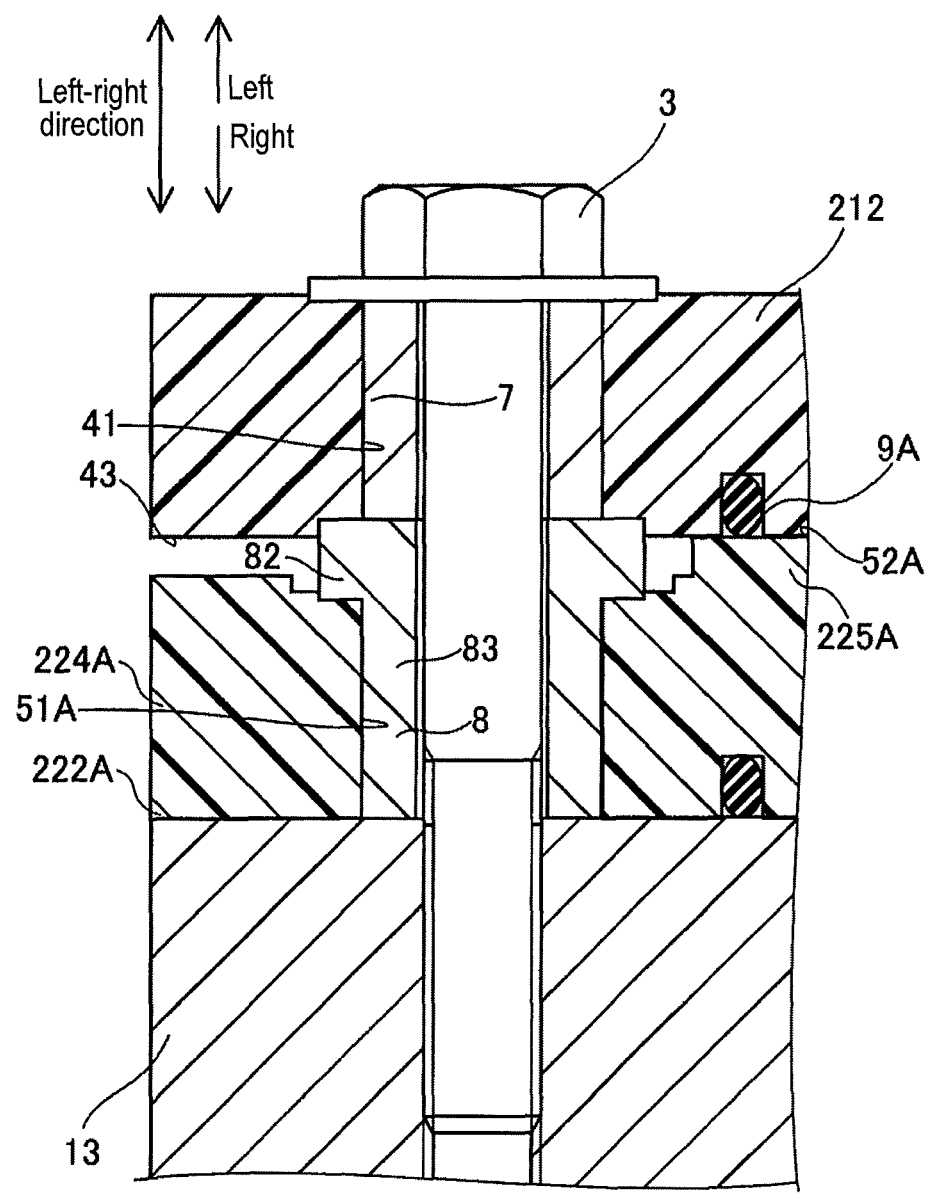
FIG. 6 is a cross-sectional view illustrating the mounting structure of the air intake apparatus relative to the cylinder head according to a first modified example of the embodiment.

Next, a first modified example of the present embodiment is explained with reference to FIG. 6. Specifically, in the first modified example, a second insertion bore 51A of a second flange portion 222A made of resin is inhibited from including the first small diameter portion 51b and the first large diameter portion 51a of the embodiment. In FIG. 6, the same constructions of the first modified example as the aforementioned embodiment bear the same reference numerals and explanations thereof are omitted. In the first modified example, different constructions from those of the aforementioned embodiment are assigned with the same reference numerals but an alphabet "A" is added after each of the reference numerals.

As illustrated in FIG. 6, the second flange portion 222A made of resin includes a base portion 224A provided in the vicinity of the second insertion bore 51A and a protruding portion 225A protruding leftward from the base portion 224A. A left surface of the protruding portion 225A makes contact with each of the second contact surface 43 of the first flange portion 212 and a seal member 9A. A clearance is provided between a left surface of the base portion 224A and the second contact surface 43 of the first flange portion 212. The other constructions of the first modified example are the same as the aforementioned embodiment.

The following effects are obtainable by the first modified example of the embodiment.

In the first modified example of the embodiment, the protruding portion 225A is provided at the second flange portion 222A. Thus, even in a case where the clearance is provided between the left surface of the base portion 224A and the second contact surface 43 of the first flange portion 212, the protruding portion 225A may press and crush the seal member 9A provided at the second contact surface 43 of the first flange portion 212. As a result, sealing ability between the first flange portion 212 and the second flange portion 222A may be secured. In addition, because the left surface of the protruding portion 225A is arranged at a left side relative to the left surface of the base portion 224A, the second contact surface 43 makes contact with the left surface of the protruding portion 225A before the second contact surface 43 and the base portion 224A make contact with each other upon fastening of the first flange portion 212 and the second flange portion 222A by each of the fasteners 3. Accordingly, because the clearance is provided between the left surface of the base portion 224A and the second contact surface 43, a reaction force from the left surface of the base portion 224A to the second contact surface 43 is inhibited from generating upon fastening by the fastener 3. As a result, the fastening force necessary for the fastening by the fastener 3 may be reduced as compared to a case where the protruding portion 225A is not provided. At this time, even in a case where the left surface of the base portion 224A and the second contact surface 43 make contact with each other and the clearance is not provided therebetween, the reaction force from the left surface of the base portion 224A to the second contact surface 43 generated upon fastening by the fastener 3 may be reduced because the left surface of the protruding portion 225A is pressed and crushed. As a result, the fastening force necessary for the fastening by the fastener 3 may be reduced as compared to a case where the protruding portion 225A is not provided. The effects of the first modified example are similar to the aforementioned effects of the embodiment.

Figure 7:
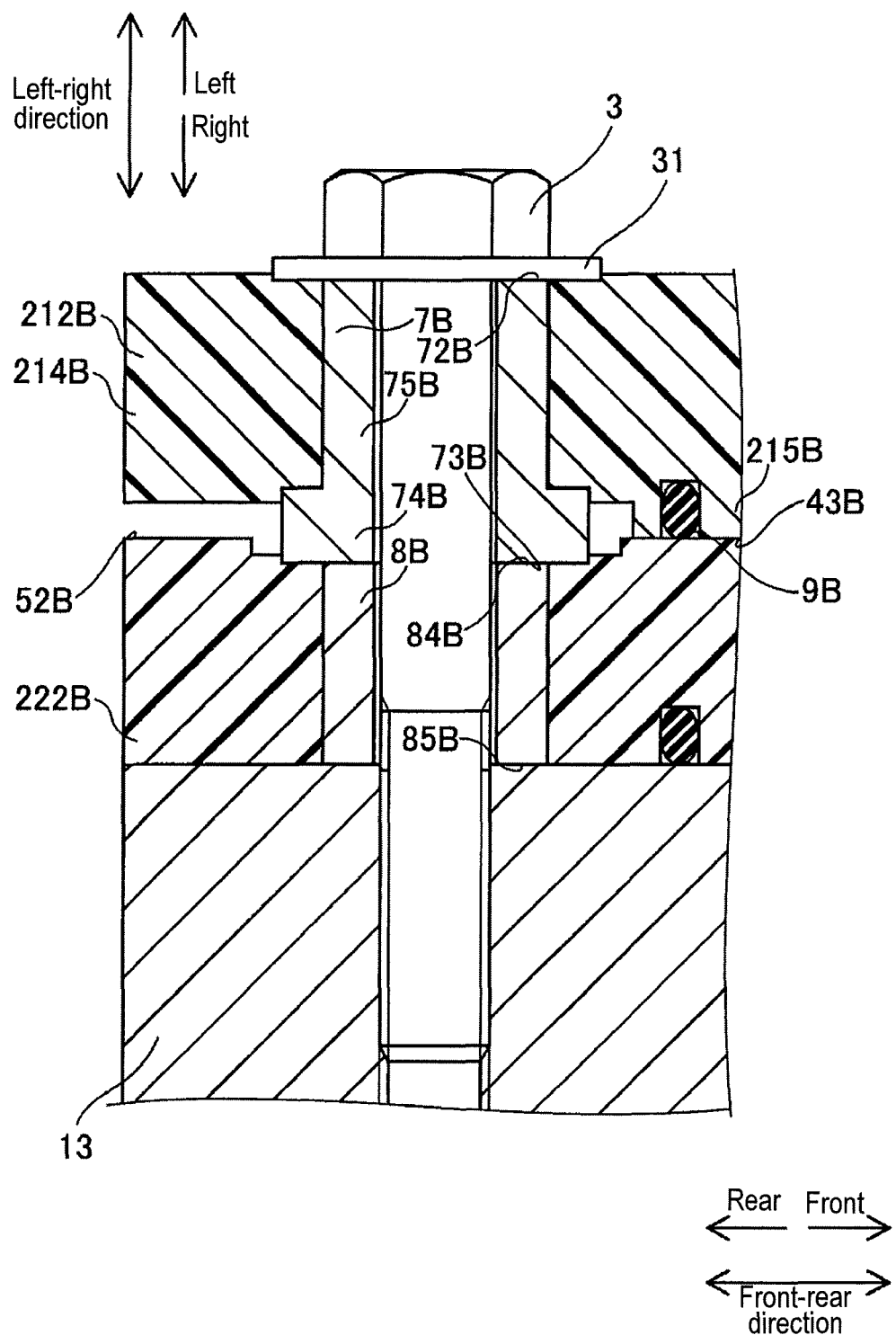
FIG. 7 is a cross-sectional view illustrating the mounting structure of the air intake apparatus and the cylinder head according to a second modified example of the embodiment.

A second modified example of the embodiment is explained with reference to FIG. 7. Specifically, in the second modified example, a first collar member 7B fitted to the first insertion bore 41 of a first flange portion 212B includes a third large diameter portion 74B. In FIG. 7, the same constructions of the second modified example as the aforementioned embodiment bear the same reference numerals and explanations thereof are omitted. In the second modified example, different constructions from those of the aforementioned embodiment are assigned with the same reference numerals but an alphabet "B" is added after each of the reference numerals.

As illustrated in FIG. 7, the first collar member 7B includes the third large diameter portion 74B serving as an example of the large diameter annular portion and an example of the flange portion, and a third small diameter portion 75B serving as an example of the body portion. The third large diameter portion 74B is integrally provided with the third small diameter portion 75B of the first collar member 7B. The third large diameter portion 74B is arranged between the third small diameter portion 75B and a second collar member 8B. An outer diameter of the third large diameter portion 74B is greater than an outer diameter of the second collar member 8B and greater than an outer diameter of the third small diameter portion 75B.

A left surface of the first collar member 7B forms a first contact surface 72B which makes contact with the flange portion 31 of the fastener 3 as illustrated in FIG. 7. A right surface of the first collar member 7B forms a second contact surface 73B which makes contact with a left surface of the second collar member 8B. The left surface of the second collar member 8B forms a third contact surface 84B which makes contact with the second contact surface 73B of the first collar member 7B as illustrated in FIG. 7. A right surface of the second collar member 8B forms a fourth contact surface 85B which makes contact with the cylinder head 13.

The first flange portion 212B includes a base portion 214B provided in the vicinity of the first insertion bore 41 and a protruding portion 215B protruding rightward from the base portion 214B. A clearance is provided between a right surface of the base portion 214B and a third contact surface 52B of a second flange portion 222B. A seal member 9B is provided at a right surface of the protruding portion 215B. The seal member 9B makes contact with the third contact surface 52B of the second flange portion 222B. The other constructions of the second modified example are the same as the aforementioned embodiment.

The following effects are obtainable by the second modified example of the embodiment.

In the second modified example of the embodiment, the first collar member 7B includes the third large diameter portion 74B. Thus, the third large diameter portion 74B may directly apply a compression force to the second flange portion 222B made of resin. The first flange portion 212B and the second flange portion 222B may therefore securely and closely make contact with each other. The effects of the second modified example are similar to the aforementioned effects of the embodiment.

Figure 8:
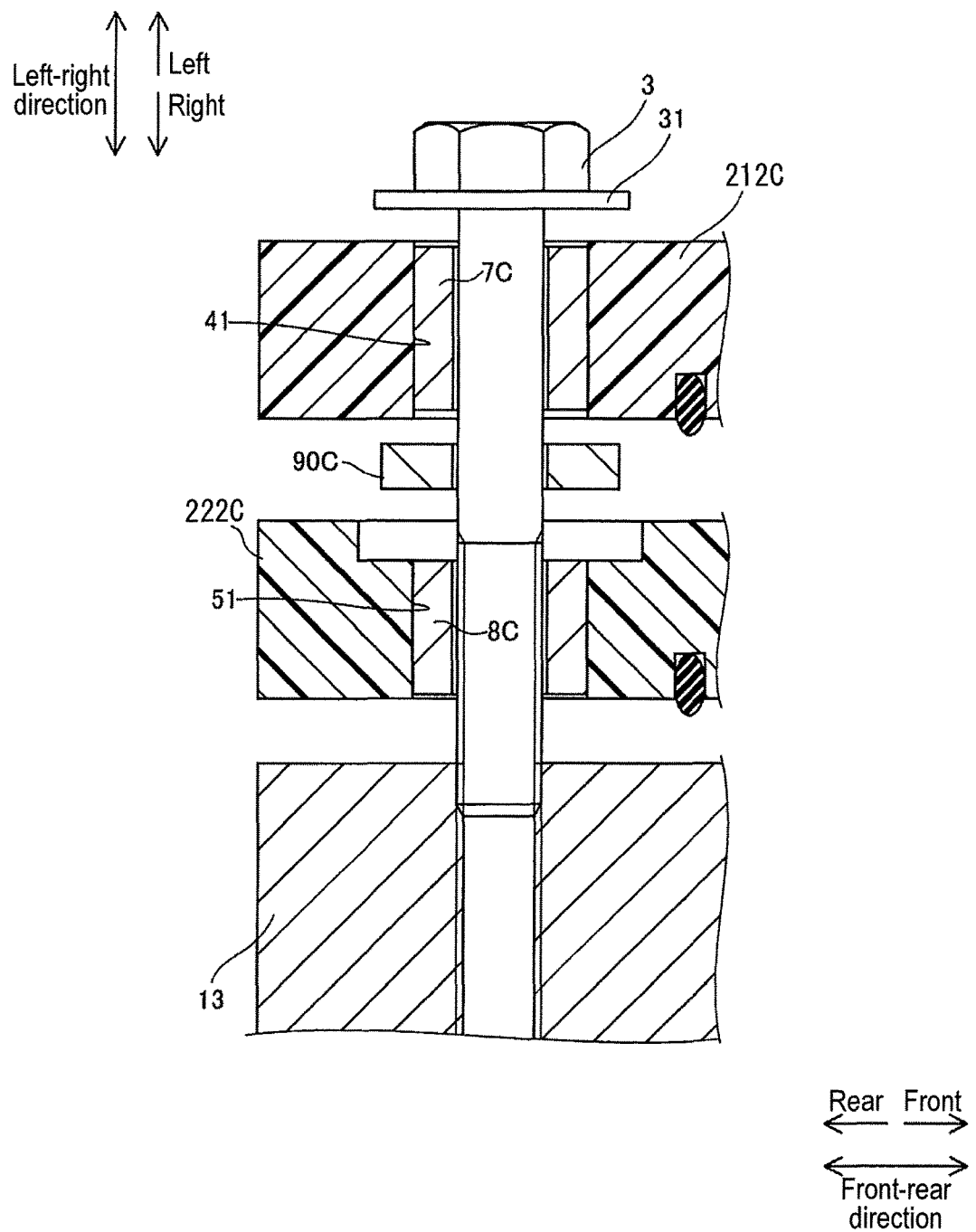
FIG. 8 is a cross-sectional view illustrating the fastening structure of the first flange portion to which the first collar member is fitted and the second flange portion to which the second collar member is fitted relative to the cylinder head according to a third modified example of the embodiment.
Figure 9:
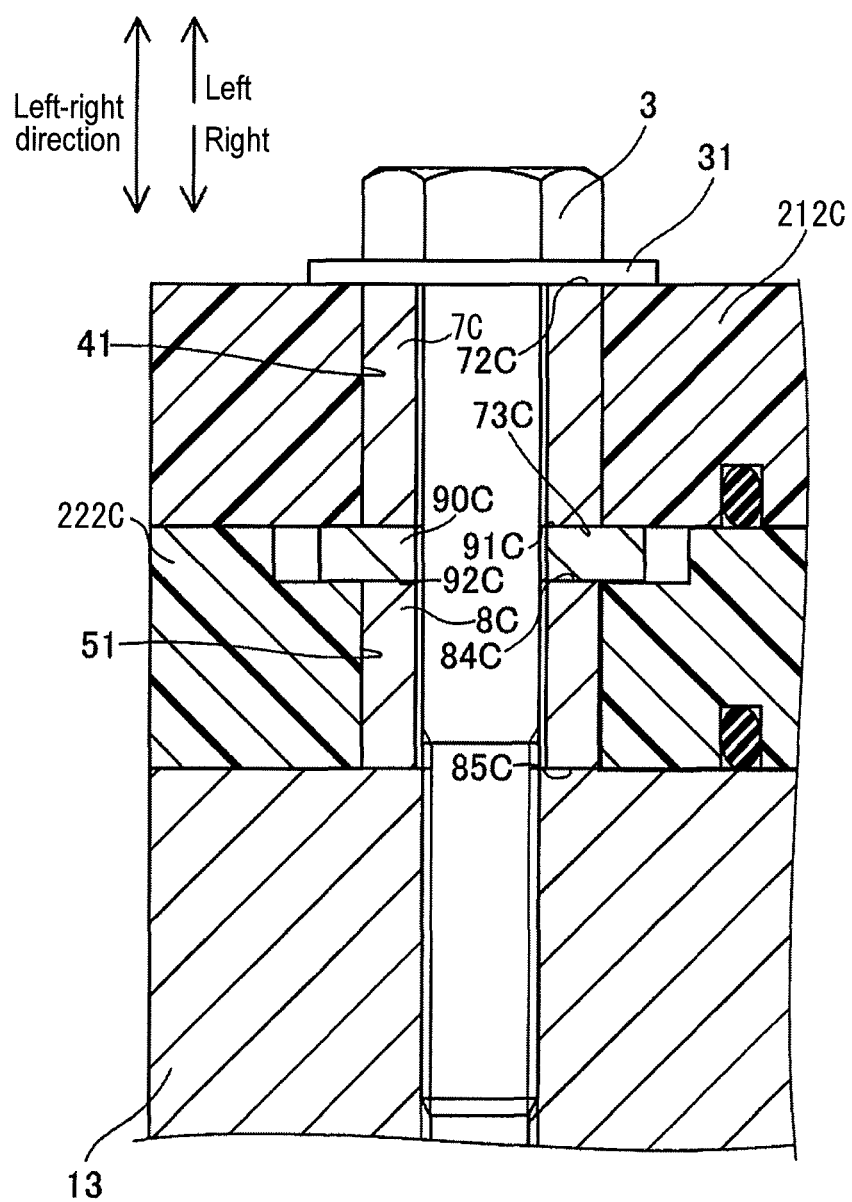
FIG. 9 is a cross-sectional view illustrating the mounting structure of the air intake apparatus relative to the cylinder head according to the third modified example of the embodiment.

A third modified example of the embodiment is explained with reference to FIGS. 8 and 9. Specifically, in the third modified example, a first collar member 7C fitted into the first insertion bore 41 of a first flange portion 212C made of resin is inhibited from including the third large diameter portion 74B. In addition, a second collar member 8C fitted into the second insertion bore 51 of a second flange portion 222C made of resin is inhibited from including the second large diameter portion 82. In FIGS. 8 and 9, the same constructions of the third modified example as the aforementioned embodiment bear the same reference numerals and explanations thereof are omitted. In the third modified example, different constructions from those of the aforementioned embodiment are assigned with the same reference numerals but an alphabet "C" is added after each of the reference numerals.

As illustrated in FIGS. 8 and 9, the mounting structure of the air intake apparatus 2 includes a washer member 90C made of metal separately provided from the first collar member 7C made of metal or the second collar member 8C made of metal. Each of the first collar member 7C and the second collar member 8C includes a cylindrical form. The washer member 90C includes an annular form including a bore at a center portion, the bore through which the fastener 3 penetrates. The washer member 90C serves as an example of the large diameter annular portion.

A left surface of the first collar member 7C forms a first contact surface 72C which makes contact with the flange portion 31 of the fastener 3 as illustrated in FIG. 9. A right surface of the first collar member 7C forms a second contact surface 73C which makes contact with a left surface of the washer member 90C. A left surface of the second collar member 8C forms a third contact surface 84C which makes contact with a right surface of the washer member 90C as illustrated in FIG. 9. A right surface of the second collar member 8C forms a fourth contact surface 85C which makes contact with the cylinder head 13. The left surface of the washer member 90C forms a fifth contact surface 91C which makes contact with the right surface of the first collar member 7C. The right surface of the washer member 90C forms a ninth contact surface 92C which makes contact with the left surface of the second collar member 8C. The other constructions of the third modified example are the same as the aforementioned embodiment.

The following effects are obtainable by the third modified example of the embodiment.

In the third modified example of the embodiment, the configurations of the first collar member 7C and the second collar member 8C may be simplified as compared to a case where the washer member 90C is integrally provided at the first collar member 7C or the second collar member 8C in the cylindrical form. As a result, the first collar member 7C and the second collar member 8C may be easily manufactured. The effects of the third modified example are similar to the aforementioned effects of the embodiment.

The aforementioned embodiment and the modified examples thereof are exemplarily disclosed at all points and may be appropriately modified.

For example, in the embodiment and the modified examples thereof, the mounting structure of the air intake apparatus 2 is explained as the example of the mounting structure of the air intake apparatus and the fastening structure of the resin member. Alternatively, a structure in the vicinity of a fastening portion between a cylinder head cover made of resin and a cylinder block made of metal, for example, may be applicable to the mounting structure of the air intake apparatus and the fastening structure of the resin member.

Figure 10:
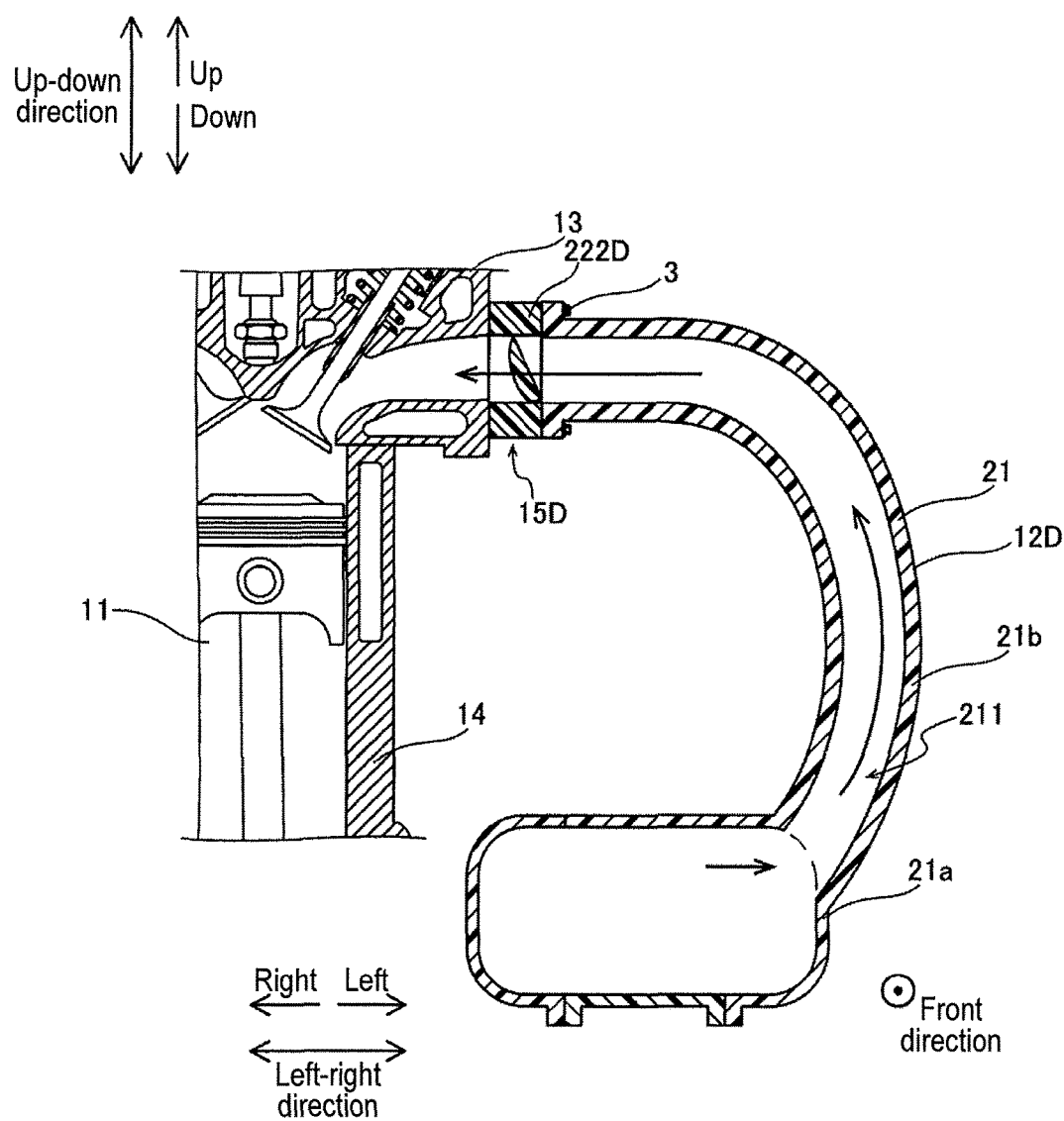
FIG. 10 is a cross-sectional view schematically illustrating the mounting structure of the air intake apparatus relative to the cylinder head according to a fourth modified example of the embodiment.

In addition, in the embodiment and the modified examples thereof, the first intake portion 21 (intake manifold 12) and the second intake portion 22 (intake port) are explained as the example of the resin member. Alternatively, an airflow control valve 15D including a second flange portion 222D made of resin may be arranged between the intake manifold 12 and the cylinder head 13 as a second intake portion 12D, for example, as illustrated in FIG. 10 according to a fourth modified example of the embodiment.

Further, in the embodiment and the modified examples thereof, the difference between the length L3 of the first collar member 7 in the left-right direction and the length L4 of the first insertion bore 41 in the left-right direction is approximately 1% of the length L4. Alternatively, the difference between the length L3 and the length L4 may be in a range from approximately 1% to approximately 5% of the length L4, for example.

Further, in the embodiment and the modified examples thereof, the difference between the length L7 of the second collar member 8 in the left-right direction and the length L8 of the second insertion bore 51 in the left-right direction is approximately 1% of the length L8. Alternatively, the difference between the length L7 and the length L8 may be in a range from approximately 1% to approximately 5% of the length L8, for example.

Further, in the embodiment and the modified examples thereof, the first collar member 7 and the second collar member 8 including the second large diameter portion 82 which serves as the large diameter annular portion are separately provided from each other. Alternatively, the first collar member 7, the second collar member 8 and the large diameter annular portion may be integrally provided with one another, for example.

Further, in the embodiment and the modified examples thereof, the left end portion of the second large diameter portion 82 protrudes leftward from the second contact surface 43. Alternatively, the left end portion of the second large diameter portion 82 and the second contact surface 43 may be coplanar with each other.

Further, in the embodiment and the modified examples thereof, the first collar member 7 is fitted into the first insertion bore 41 and the second collar member 8 is fitted into the second insertion bore 51. Alternatively, the first collar member 7 may be assembled by insert-molding on the first flange portion 212 and the second collar member 8 may be assembled by insert-molding on the second flange portion 222, for example.

Further, in the embodiment and the modified examples thereof, the air intake apparatus 2 includes the first flange portion 212 and the second flange portion 222. Alternatively, the air intake apparatus 2 may further include a third flange portion and a fourth flange portion, for example.

According to the embodiment and the modified examples thereof, the mounting structure of the air intake apparatus includes the air intake apparatus 2 made of resin and including the first flange portion 212, 212B, 212C (first mounting portion) made of resin and the second flange portion 222, 222B, 222C, 222D (second mounting portion) made of resin, the first flange portion 212, 212B, 212C being mounted to the cylinder head 13 of the engine 1, the second flange portion 222, 222B, 222C, 222D being disposed between the first flange portion 212, 212B, 212C and the cylinder head 13, the first collar member 7, 7B, 7C made of metal and inserted to be positioned within the first insertion bore 41 (first mounting bore) provided at the first flange portion 212, 212B, 212C, the second collar member 8, 8B, 8C made of metal and inserted to be positioned within the second insertion bore 51 (second mounting bore) provided at the second flange portion 222, 222B, 222C, 222D, and the large diameter annular portion (the second large diameter portion, the third large diameter portion, the washer portion) 82, 74B, 90C made of metal and provided between the first collar member 7, 7B, 7C and the second collar member 8, 8B, 8C, the large diameter annular portion 82, 74B, 90C including the outer diameter greater than the outer diameter of the first collar member 7, 7B, 7C or the third small diameter portion 75B (body portion) and greater than the outer diameter of the second small diameter portion 83 (body portion) of the second collar member 8, 8B, 8C, the first collar member 7, 7B, 7C, the large diameter annular portion 82, 74B, 90C and the second collar member 8, 8B, 8C being fastened to one another while making contact with one another in a state where the first flange portion 212, 212B, 212C and the second flange portion 222, 222B, 222C, 222D are fastened together relative to the cylinder head 13 of the engine 1 by the fastener 3 (fastening member) which is inserted to be positioned within the first collar member 7, 7B, 7C, the large diameter annular portion 82, 74B, 90C and the second collar member 8, 8B, 8C.

Accordingly, the first collar member 7, 7B, 7C made of metal, the large diameter annular portion 82, 74B, 90C made of metal and the second collar member 8, 8B, 8C made of metal are in contact with one another in a state where the first flange portion 212, 212B, 212C made of resin and the second flange portion 222, 222B, 222C, 222D made of resin are fastened together relative to the cylinder head 13. Accordingly, the first flange portion 212, 212B, 212C made of resin and the second flange portion 222, 222B, 222C, 222D made of resin are restrained from being applied with an excess load from each of the fastener 3 and the cylinder head 13 because a load caused by fastening of the fastener 3 is applied to each of the first collar member 7, 7B, 7C, the large diameter annular portion 82, 74B, 90C and the second collar member 8, 8B, 8C. Each of the first flange portion 212, 212B, 212C made of resin and the second flange portion 222, 222B, 222C, 222D made of resin is thus restrained from suffering from creep which may increase strain deformation as time proceeds because of an excess stress generated at each of the first flange portion 212, 212B, 212C and the second flange portion 222, 222B, 222C, 222D. As a result, looseness of the fastener 3 resulting from creep at each of the first flange portion 212, 212B, 212C made of resin and the second flange portion 222, 222B, 222C, 222D made of resin is restrained.

In addition, the large diameter annular portion 82, 74B, 90C including the outer diameter greater than the outer diameter of the first collar member 7, 7B, 7C or the third small diameter portion 75B and greater than the outer diameter of the second small diameter portion 83 of the second collar member 8, 8B, 8C is provided between the first collar member 7, 7B, 7C and the second collar member 8, 8B, 8C. Thus, the first collar member 7, 7B, 7C is restrained from getting into the second collar member 8, 8B, 8C or the second collar member 8, 8B, 8C is restrained from getting into the first collar member 7, 7B, 7C. Further, the first collar member 7, 7B, 7C is restrained from getting into the second insertion bore 51 or the second collar member 8, 8B, 8C is restrained from getting into the first insertion bore 41. As a result, in a state where the first flange portion 212, 212B, 212C and the second flange portion 222, 222B, 222C, 222D are fastened together, a clearance is restrained from being formed between any of the fastener 3, the first collar member 7, 7B, 7C, the large diameter annular portion 82, 74B, 90C and the second collar member 8, 8B, 8C. Because the large diameter annular portion 82, 74B, 90C and each of the first collar member 7, 7B, 7C and the second collar member 8, 8B, 8C are in contact with each other, the fastening force (axial force) of the fastener 3 may be easily secured constant as compared to a case where the large diameter annular portion 82, 74B, 90C and each of the first collar member 7, 7B, 7C and the second collar member 8, 8B, 8C are inhibited from making contact with each other.

In a state where the first collar member 7, 7B, 7C, the large diameter annular portion 82, 74B, 90C and the second collar member 8, 8B, 8C are fastened to one another by the fasteners 3, the large diameter annular portion 82, 74B, 90C is coplanar with one of the second contact surface 43 (first surface) of the first flange portion 212, 212B, 212C facing the second flange portion 222, 222B, 222C, 222D and the third contact surface 52 (second surface) of the second flange portion 222, 222B, 222C, 222D facing the first flange portion 212, 212B, 212C or protrudes from one of the second contact surface 43 and the third contact surface 52 to the other of the second contact surface 43 and the third contact surface 52 at the boundary portion 60 between the second contact surface 43 and the third contact surface 52.

Accordingly, the flange portion 31 of the fastener 3 and the large diameter annular portion 82, 74B, 90C may securely sandwich the first flange portion 212, 212B, 212C. In addition, the large diameter annular portion 82, 74B, 90C and the cylinder head 13 may securely sandwich the second flange portion 222, 222B, 222C, 222D. As a result, a clearance may be difficult to be formed between the first flange portion 212, 212B, 212C and any of the flange portion 31 of the fastener 3 and the large diameter annular portion 82, 74B, 90C. A clearance may be also difficult to be formed between the second flange portion 222, 222B, 222C, 222D and any of the large diameter annular portion 82, 74B, 90C and the cylinder head 13.

The large diameter annular portion includes the second (third) large diameter portion 82, 74B (flange portion) made of metal integrally provided with one of the first collar member 7, 7B and the second collar member 8, 8B.

Accordingly, as compared to a case where the second (third) large diameter portion 82, 74B and the first collar member 7, 7B or the second collar member 8, 8B are separately provided with each other, the number of components may decrease and a fastening operation may be easily performed.

The large diameter annular portion includes the washer member 90C provided separately from the first collar member 7C and the second collar member 8C.

Accordingly, configurations of the first collar member 7C and the second collar member 8C may be simplified as compared to a case where the large diameter annular portion and the first collar member 7C or the second collar member 8C are integrally provided with each other.

The mounting method of the air intake apparatus includes the first preparing process preparing the first flange portion 212, 212B, 212C made of resin and including the first insertion bore 41 into which the first collar member 7, 7B, 7C made of metal is inserted to be positioned, the second preparing process preparing the second flange portion 222, 222B, 222C, 222D made of resin and including the second insertion bore 51 into which the second collar member 8, 8B, 8C made of metal is inserted to be positioned, the second insertion bore 51 including a shorter length in a center axis direction thereof than a length of the second collar member 8, 8B, 8C in a center axis direction thereof, the arranging process arranging the large diameter annular portion 82, 74B, 90C made of metal between the first collar member 7, 7B, 7C and the second collar member 8, 8B, 8C so that the large diameter annular portion 82, 74B, 90C protrudes from one of the second contact surface 43 of the first flange portion 212, 212B, 212C and the third contact surface 52 of the second flange portion 222, 222B, 222C, 222D to the other of the second contact surface 43 and the third contact surface 52 at the boundary portion 60 between the second contact surface 43 and the third contact surface 52, the large diameter annular portion 82, 74B, 90C including the outer diameter greater than the outer diameter of the first collar member 7, 7B, 7C or the third small diameter portion 75B and greater than the outer diameter of the second small diameter portion 83 of the second collar member 8, 8B, 8C, and the fastening process fastening the first collar member 7, 7B, 7C, the large diameter annular portion 82, 74B, 90C and the second collar member 8, 8B, 8C until the first collar member 7, 7B, 7C, the large diameter annular portion 82, 74B, 90C and the second collar member 8, 8B, 8C make contact with one another in a state where the first flange portion 212, 212B, 212C and the second flange portion 222, 222B, 222C, 222D are fastened together relative to the cylinder head 13 of the engine 1 by the fastener 3 which is inserted to be positioned within the first collar member 7, 7B, 7C, the large diameter annular portion 82, 74B, 90C and the second collar member 8, 8B, 8C.

Accordingly, even when an excess fastening force is applied to the fastener 3 so as to excessively compress the first flange portion 212, 212B, 212C and the second flange portion 222, 222B, 222C, 222D, the first flange portion 212, 212B, 212C and the second flange portion 222, 222B, 222C, 222D are restrained from being excessively compressed because of the first collar member 7, 7B, 7C, the large diameter annular portion 82, 74B, 90C and the second collar member 8, 8B, 8C. As a result, the first flange portion 212, 212B, 212C made of resin and the second flange portion 222, 222B, 222C, 222D made of resin are restrained from being excessively compressed and are restrained from being damaged.

The fastening process includes fastening the first collar member 7, 7B, 7C, the large diameter annular portion 82, 74B, 90C and the second collar member 8, 8B, 8C so that the first collar member 7, 7B, 7C, the large diameter annular portion 82, 74B, 90C and the second collar member 8, 8B, 8C make contact with one another and the fourth contact surface 53 (end surface) of the second collar member 8, 8B, 8C positioned opposite from the first collar member 7, 7B, 7C makes contact with the front surface 13e (mounting surface) of the cylinder head 13 in a state where the first flange portion 212, 212B, 212C is pressed and crushed by the fastener 3 and the second flange portion 222, 222B, 222C, 222D is pressed and crushed by the large diameter annular portion 82, 74B, 90C in a case where the first collar member 7, 7B, 7C, the large diameter annular portion 82, 74B, 90C and the second collar member 8, 8B, 8C are fastened to one another by the fastener 3.

Accordingly, in a state where the first flange portion 212, 212B, 212C is pressed and crushed by the fastener 3 and the second flange portion 222, 222B, 222C, 222D is pressed and crushed by the large diameter annular portion 82, 74B, 90C, the fastener 3, the first collar member 7, 7B, 7C, the large diameter annular portion 82, 74B, 90C, and the second collar member 8, 8B, 8C may make contact with one another. As a result, the fastening force (axial force) of the fastener 3 may be greater than the axial force of the fastener 3 obtained in a state where the second flange portion 222, 222B, 222C, 222D is not pressed or crushed by the large diameter annular portion 82, 74B, 90C, and the first flange portion 212, 212B, 212C is not pressed or crushed by the fastener 3. Further, in a state where the first flange portion 212, 212B, 212C and the second flange portion 222, 222B, 222C, 222D are pressed and crushed, the fastener 3, the first flange portion 212, 212B, 212C, the large diameter annular portion 82, 74B, 90C, and the second flange portion 222, 222B, 222C, 222D make contact with one another. Thus, an excess compression force is restrained from being applied to the first flange portion 212, 212B, 212C and the second flange portion 222, 222B, 222C, 222D. The fastening force of the fastener 3 may increase accordingly.

The fastening structure of the resin member includes the first flange portion 212, 212B, 212C made of resin and mounted to the metal member (cylinder head 13), the second flange portion 222, 222B, 222C, 222D made of resin and disposed between the first flange portion 212, 212B, 212C and the metal member, the first collar member 7, 7B, 7C made of metal and inserted to be positioned within the first insertion bore 41 provided at the first flange portion 212, 212B, 212C, the second collar member 8, 8B, 8C made of metal and inserted to be positioned within the second insertion bore 51 provided at the second flange portion 222, 222B, 222C, 222D, and the large diameter annular portion 82, 74B, 90C made of metal and provided between the first collar member 7, 7B, 7C and the second collar member 8, 8B, 8C, the large diameter annular portion 82, 74B, 90C including the outer diameter greater than the outer diameter of the first collar member 7, 7B, 7C or the third small diameter portion 75B and greater than the outer diameter of the second small diameter portion 83 of the second collar member 8, 8B, 8C, the first collar member 7, 7B, 7C, the large diameter annular portion 82, 74B, 90C and the second collar member 8, 8B, 8C being fastened to one another while making contact with one another in a state where the first flange portion 212, 212B, 212C and the second flange portion 222, 222B, 222C, 222D are fastened together relative to the metal member by the fastener 3 which is inserted to be positioned within the first collar member 7, 7B, 7C, the large diameter annular portion 82, 74B, 90C and the second collar member 8, 8B, 8C.

Accordingly, the first flange portion 212, 212B, 212C made of resin and the second flange portion 222, 222B, 222C, 222D made of resin are restrained from being applied with an excess load from each of the fasteners 3 and the metal member (cylinder head 13) because a load caused by fastening of the fastener 3 is applied to each of the first collar member 7, 7B, 7C, the large diameter annular portion 82, 74B, 90C and the second collar member 8, 8B, 8C. As a result, deformation of each of the first flange portion 212, 212B, 212C made of resin and the second flange portion 222, 222B, 222C, 222D made of resin is restrained. In addition, because the large diameter annular portion 82, 74B, 90C is provided between the first collar member 7, 7B, 7C and the second collar member 8, 8B, 8C, the first collar member 7, 7B, 7C is restrained from getting into the second collar member 8, 8B, 8C or the second collar member 8, 8B, 8C is restrained from getting into the first collar member 7, 7B, 7C. As a result, a clearance is restrained from being formed between any of the fastener 3, the first collar member 7, 7B, 7C, the large diameter annular portion 82, 74B, 90C and the second collar member 8, 8B, 8C in a state where the first flange portion 212, 212B, 212C and the second flange portion 222, 222B, 222C, 222D are fastened together by the fastener 3.

According to the mounting structure of the intake apparatus, the intake apparatus 2 includes the second flange portion 222D made of resin and the airflow control valve 15D which controls air supplied within the engine 1.

The principles, preferred embodiment and mode of operation of the present invention have been described in the foregoing specification. However, the invention which is intended to be protected is not to be construed as limited to the particular embodiments disclosed. Further, the embodiments described herein are to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

The invention claimed is:

1. A mounting structure of an air intake apparatus, comprising:
an air intake apparatus made of resin and including a first mounting portion made of resin and a second mounting portion made of resin, the first mounting portion being mounted to a cylinder head of an engine, the second mounting portion being disposed between the first mounting portion and the cylinder head;
a first collar member made of metal and inserted to be positioned within a first mounting bore provided at the first mounting portion;

a second collar member made of metal and inserted to be positioned within a second mounting bore provided at the second mounting portion; and a large diameter annular portion made of metal and provided between the first collar member and the second collar member, the large diameter annular portion including an outer diameter greater than an outer diameter of a body portion of the first collar member and greater than an outer diameter of a body portion of the second collar member, the first collar member, the large diameter annular portion and the second collar member being fastened to one another while making contact with one another in a state where the first mounting portion and the second mounting portion are fastened together relative to the cylinder head of the engine by a fastening member which is inserted to be positioned within the first collar member, the large diameter annular portion and the second collar member.

2. The mounting structure according to claim 1, wherein in a state where the first collar member, the large diameter annular portion and the second collar member are fastened to one another by the fastening member, the large diameter annular portion is coplanar with one of a first surface of the first mounting portion facing the second mounting portion and a second surface of the second mounting portion facing the first mounting portion or protrudes from one of the first surface and the second surface to the other of the first surface and the second surface at a boundary portion between the first surface and the second surface.

3. The mounting structure according to claim 1, wherein the large diameter annular portion includes a flange portion made of metal integrally provided with one of the first collar member and the second collar member.

4. The mounting structure according to claim 1, wherein the large diameter annular portion includes a washer member provided separately from the first collar member and the second collar member.

5. A mounting method of an air intake apparatus, comprising:

a first preparing process preparing a first mounting portion made of resin and including a first mounting bore into which a first collar member made of metal is inserted to be positioned;

a second preparing process preparing a second mounting portion made of resin and including a second mounting bore into which a second collar member made of metal is inserted to be positioned, the second mounting bore including a shorter length in a center axis direction thereof than a length of the second collar member in a center axis direction thereof;

an arranging process arranging a large diameter annular portion made of metal between the first collar member and the second collar member so that the large diameter annular portion protrudes from one of a first surface of the first mounting portion and a second surface of the second mounting portion to the other of the first surface and the second surface at a boundary portion between the first surface and the second surface, the large diameter annular portion including an outer diameter greater than an outer diameter of a body portion of the first collar member and greater than an outer diameter of a body portion of the second collar member; and a fastening process fastening the first collar member, the large diameter annular portion and the second collar member until the first collar member, the large diameter annular portion and the second collar member make contact with one another in a state where the first mounting portion and the second mounting portion are fastened together relative to a cylinder head of an engine by a fastening member which is inserted to be positioned within the first collar member, the large diameter annular portion and the second collar member.

6. The mounting method according to claim 5, wherein the fastening process includes fastening the first collar member, the large diameter annular portion and the second collar member so that the first collar member, the large diameter annular portion and the second collar member make contact with one another and an end surface of the second collar member positioned opposite from the first collar member makes contact with a mounting surface of the cylinder head in a state where the first mounting portion is pressed and crushed by the fastening member and the second mounting portion is pressed and crushed by the large diameter annular portion in a case where the first collar member, the large diameter annular portion and the second collar member are fastened to one another by the fastening member.

7. A fastening structure of a resin member, comprising:

a first mounting portion made of resin and mounted to a metal member;

a second mounting portion made of resin and disposed between the first mounting portion and the metal member;

a first collar member made of metal and inserted to be positioned within a first mounting bore provided at the first mounting portion;

a second collar member made of metal and inserted to be positioned within a second mounting bore provided at the second mounting portion; and a large diameter annular portion made of metal and provided between the first collar member and the second collar member, the large diameter annular portion including an outer diameter greater than an outer diameter of a body portion of the first collar member and greater than an outer diameter of a body portion of the second collar member, the first collar member, the large diameter annular portion and the second collar member being fastened to one another while making contact with one another in a state where the first mounting portion and the second mounting portion are fastened together relative to the metal member by a fastening member which is inserted to be positioned within the first collar member, the large diameter annular portion and the second collar member.

* * * * *